R. N. EHRHART.
SYSTEM FOR REMOVING AIR AND GASES FROM WATER.
APPLICATION FILED APR. 1, 1921.
1,401,116. Patented Dec. 20, 1921.
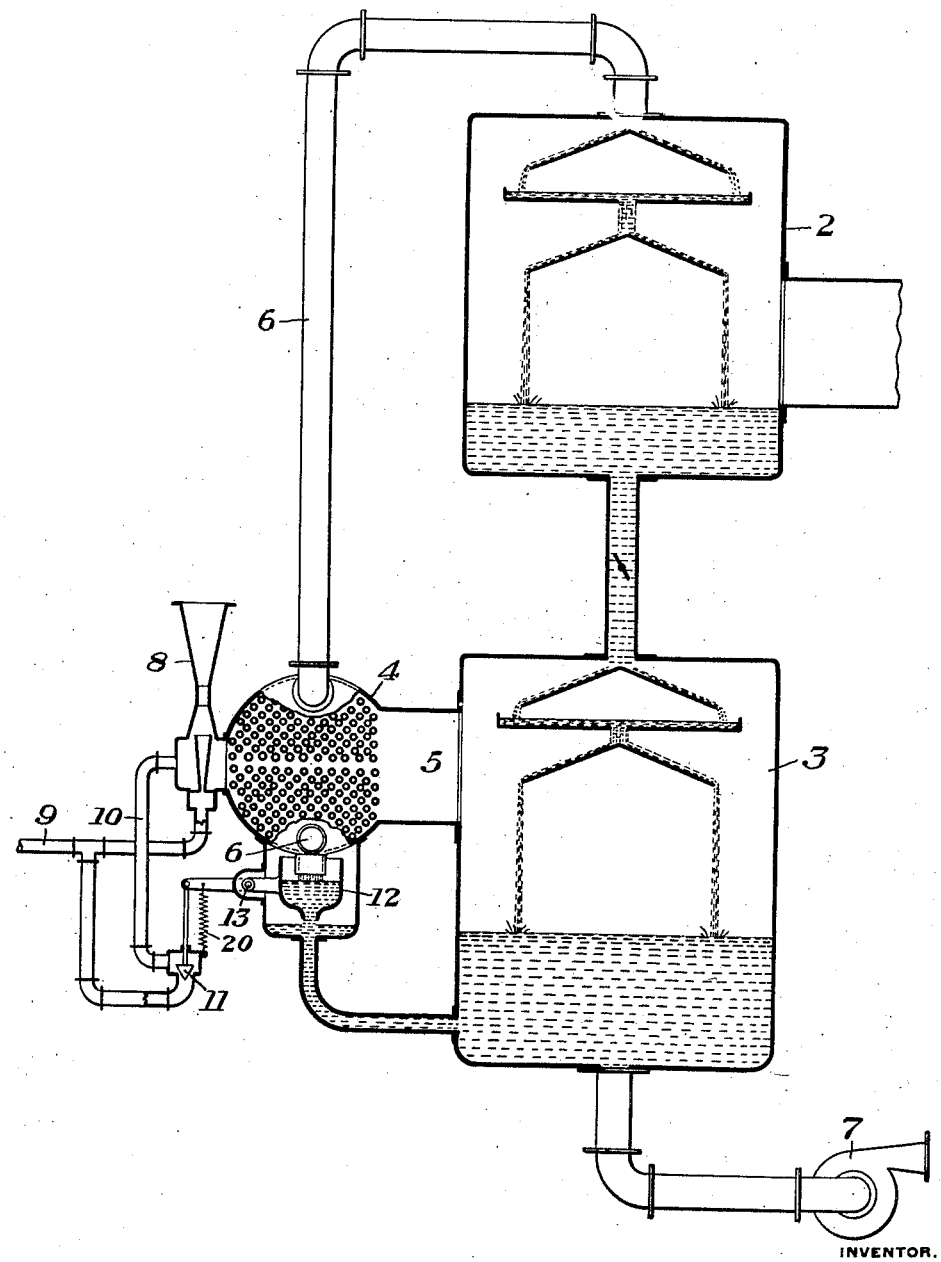
INVENTOR.

UNITED STATES PATENT OFFICE.

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA.

SYSTEM FOR REMOVING AIR AND GASES FROM WATER.

1,401,116. Specification of Letters Patent. Patented Dec. 20, 1921.

Original application filed June 5, 1920, Serial No. 386,834. Divided and this application filed April 1, 1921. Serial No. 457,596.

*To all whom it may concern:*

Be it known that I, RAYMOND N. EHRHART, residing at Pittsburgh, Allegheny county, Pennsylvania, have invented a new and useful Improvement in Systems for Removing Air and Gases from Water, of which the following is a full, clear, and exact description, reference being had to the accompanying drawing, forming part of this specification, in which:—

The figure is a diagram partly in vertical section and partly in side elevation showing one form of apparatus for carrying out my invention.

The present application is a division of my application, Serial No. 386,834, filed June 5, 1920.

My invention has relation to the treatment of liquid for the removal of air and other gases therefrom, and more particularly, to a method of treatment such as is described and claimed in the patent to William S. Elliott, No. 1,321,999, dated November 18, 1919.

In the method described and claimed in said Patent No. 1,321,999, the liquid to be treated is heated and is then introduced into an evaporator in which there is maintained a pressure lower than the pressure corresponding to the temperature of the liquid immediately before it enters the evaporator. The vapors from the evaporator are passed through a condenser from which they are exhausted, and the liquid which forms the cooling medium of the condenser passes from thence into the heater.

In my application, Serial No. 386,833, filed June 5, 1920, I have shown that in many cases it is desirable to regulate the condensation rate of the condenser used in connection with such apparatus; and that inasmuch as the amount of evaporation in the evaporator will depend upon the amount of condensation in the condenser, that by such regulation the amount of evaporation as well as the drop in temperature between the heater and the evaporator may be controlled within relatively narrow limits.

In that application, I have disclosed certain means for controlling the operation of the condenser by controlling the amount of cooling liquid passing through the condenser.

I have further discovered that a similar result may be obtained by varying the capacity of the means used in exhausting the air and other condensable gases in the condenser. Thus if the capacity of the air pump connected to the condenser and which exhausts the air vapors from the evaporator through the condenser be depreciated, the condensation rate of the condenser will be diminished accordingly.

It is well known that any air pumped under given conditions has a certain volumetric capacity. If this pump is pumping a fluid, such as air, I can readily diminish its capacity for pumping air by introducing some other fluid into the suction of the pump. For example, if the pump has a capacity for handling a certain volume of air and steam and other fluid than air be taken into the suction of the pump, a certain part of the capacity of the pump will be taken up in pumping such steam or other fluid, and its capacity for pumping air will, therefore, be diminished.

My invention provides a method and means whereby I take advantage of this fact for the effective regulation of the condenser, and thereby of the evaporation, in a system of the character described.

In the drawing, the numeral 2 designates a heater, 3 an evaporator, 4 a condenser, which has an exhaust connection 5 with the evaporator, and 6 the liquid supply system for the heater, which is connected with the heater through the condenser. 7 designates the pump for withdrawing the treated liquid from the evaporator. These parts are all arranged substantially as in the said Patent No. 1,329,119.

8 designates means for exhausting the condenser 4, such means consisting in the present instance of a steam ejector of any well known type having a steam supply connection 9. This supply pipe 9 has a branch or bypass connection 10 leading into the suction chamber of the ejector and provided with a controlling valve 11.

12 designates a vessel, which is arranged to receive the water of condensation from the condenser 4 and which is mounted upon one arm of a lever pivoted at 13 and having its other arm connected to the stem of the valve. 20 is a spring also connected to the lever and having any suitable means whereby its tension may be varied.

It will be readily seen that the vessel 12 is responsive to the rate of flow of the condensate. If this flow becomes excessive, the level of the liquid in the vessel 12 increases, thereby moving the valve 11 to admit steam into the suction of the ejector. The effect of this is to diminish the rate of condensation in the condenser. On the other hand, if the flow into the vessel 12 diminishes below the normal for the system, the valve 11 is closed, thereby preventing any steam entering the suction of the ejector and causing a corresponding increase in the rate of condensation.

It will be readily seen, therefore, that I provide means controlled by the rate of condensation in the condenser for varying the capacity of the ejector, and thereby, in turn, controlling the rate of condensation in the condenser. This, in turn, maintains the desired temperature relations between the heater and evaporator, and enables such relations to be controlled within relatively narrow limits.

It will be understood that I do not limit myself to the embodiment of my invention which I have herein shown and described, as it will be readily apparent that the valve 11 or its equivalent may be controlled in various ways by the action within the condenser.

I claim:

1. In apparatus of the character described, the combination of an evaporator, a condenser connected to the evaporator, an exhaust pump for drawing the vapors and gases from the evaporator through the condenser, and means controlled by the rate of condensation in the condenser for varying the capacity of said pump, substantially as described.

2. In apparatus of the character described, the combination of an evaporator, a condenser, an exhaust pump for drawing the vapors and gases from the evaporator through the condenser, and means for varying the capacity of said pump in accordance with the rate of condensation in the condenser, substantially as described.

3. In apparatus of the character described, the combination of an evaporator, a condenser connected to the evaporator, an exhaust pump for drawing vapor and gases from the evaporator through the condenser, and means controlled by the rate of condensation in the condenser for varying the effective action of said pump, substantially as described.

4. In apparatus of the character described, the combination of a heater, an evaporator having a supply connection with the heater, a condenser connected to the evaporator, a liquid system for the heater leading through the condenser, an ejector connected to the condenser, means for introducing a fluid other than that coming from the condenser into the suction chamber of the ejector, and means controlled by the rate of condensation in the condenser for controlling the admission of steam, substantially as described.

5. In apparatus of the character described, the combination of a heater, an evaporator connected to the discharge of the heater, a condenser connected to the evaporator, an ejector connected to the condenser to draw off the vapors and gases from the evaporator through the condenser, means for admitting a fluid other than that coming from the condenser into the suction chamber of the ejector to thereby vary its action, and means controlled by the rate of condensation in the condenser for controlling the admission of such steam, substantially as described.

6. In apparatus of the character described, the combination of a heater, an evaporator connected to the discharge of the heater, a condenser connected to the evaporator, an ejector connected to the condenser to draw off the vapors and gases from the evaporator through the condenser, means for admitting a fluid other than that coming from the condenser into the suction chamber of the ejector to vary its action, a valve for controlling the admission of steam, a movable receptacle arranged to receive the condensate from the condenser, and connections between said vessel and said valve whereby the valve is operated in accordance with the amount of condensate discharged by the condenser, substantially as described.

In testimony whereof, I have hereunto set my hand.

RAYMOND N. EHRHART.